May 15, 1962 M. J. DRAGANJAC ETAL 3,035,232
VOLTAGE AMPLITUDE CHECKING SYSTEM
Filed Sept. 11, 1957
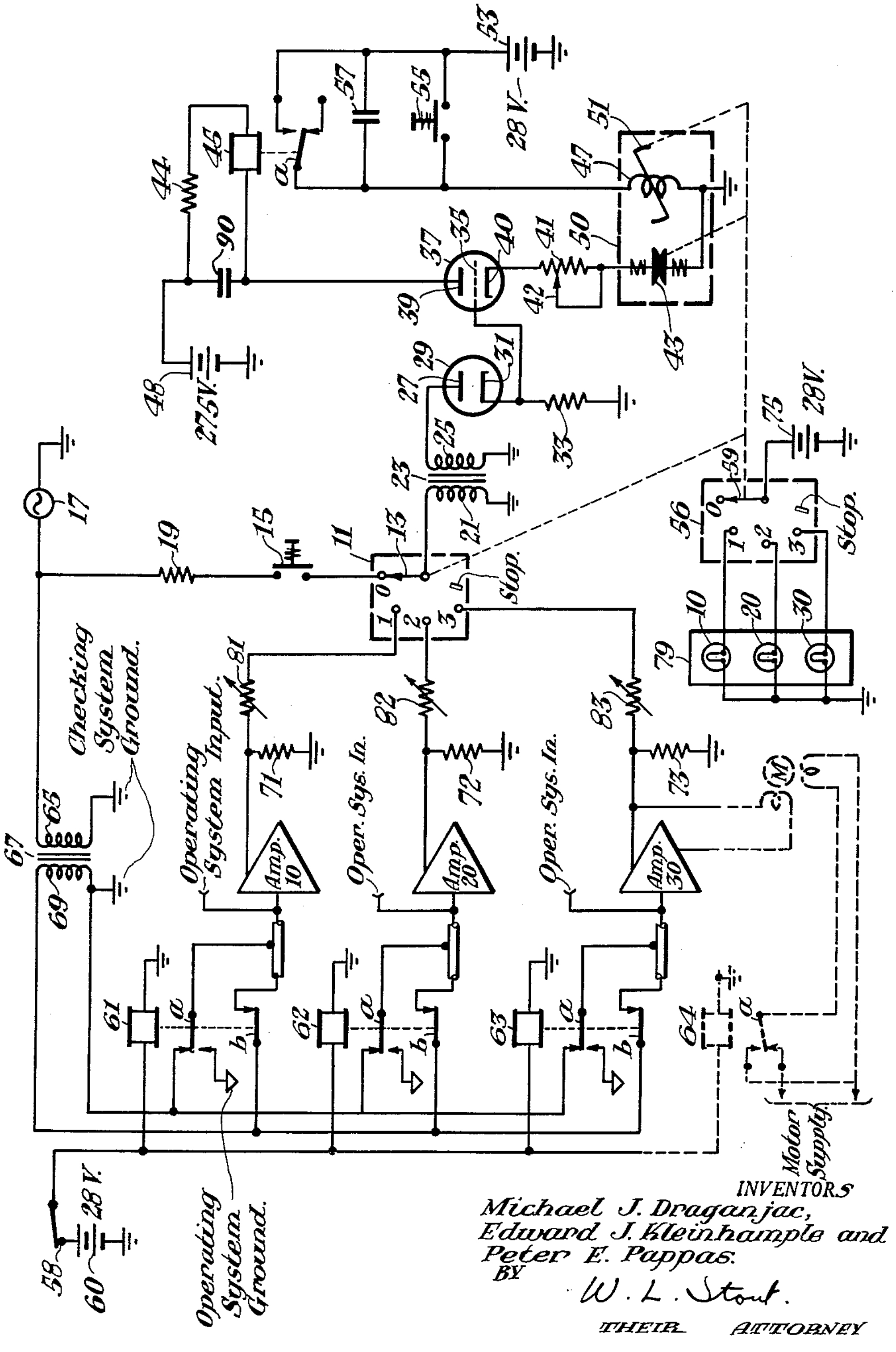
INVENTORS
Michael J. Draganjac,
Edward J. Kleinhample and
Peter E. Pappas
BY W. L. Stout.
THEIR ATTORNEY United States Patent Office 3,035,232

Patented May 15, 1962

3,035,232
VOLTAGE AMPLITUDE CHECKING SYSTEM

Michael J. Draganjac, San Diego, Calif., and Edward J. Kleinhample, Sharpsburg, and Peter E. Pappas, Brookline, Pa., assignors to Westinghouse Air Brake Company, Wilmerding, Pa., a corporation of Pennsylvania Filed Sept. 11, 1957, Ser. No. 683,315
3 Claims. (Cl. 330—2)

Our invention relates to voltage amplitude checking systems, and more particularly to a system for automatically and sequentially checking the voltage amplitude output of each of a series of components.

With the advent of more complicated electronic equipment utilizing a large number of components, it has been found desirable to check the operating characteristics of the individual components in the equipment frequently to assure satisfactory operation of the overall equipment. For example, complex electronic equipment such as analog computers commonly employ a large number of amplifiers which present a constant problem of supervision and maintenance. Frequent checks of the individual amplifiers are desirable to assure the computer is operating satisfactorily. Such checks should be capable of being quickly and simply performed, and preferably without disrupting the computer circuitry. Further, all the amplifiers in the circuit should desirably be checked individually, and an immediate indication of any faulty amplifier should be available.

It is accordingly a principal object of the present invention to provide a simplified automatic system for detecting the operating condition of each of a series of components of an overall circuit.

It has been found that the amplitude of the output of a component in the circuit, calibrated to a preset input amplitude is a good criterion of the operating condition of said component. It has also been found that the overall gain of an amplifier, without any feedback is a good criterion of the operating condition of the said amplifier.

It is accordingly another object of the present invention to provide a system for sequentially checking the amplitude output of each of a series of amplifiers.

It should be understood at the outset that although the invention will be described in relation to amplifiers, other components such as transformers or cables can likewise be checked by the system of the present invention. The normal voltage amplitude output of each component need only to be calibrated and the subsequent voltage amplitude output referred to the normal. It should also be understood that the term amplifiers is intended to include electron discharge devices or tubes as well as transistor type amplifiers.

In the attainment of the foregoing objects of the present invention we provide a system for checking the voltage output amplitude of a series of components sequentially and automatically. Means are arranged to connect each of said components to a common source of signal energy. The output of each said components is connected to a respective contact of a first switch means including a plurality of contacts and a switching arm. An electron control device connected through transformer means and rectifier means to the switch arm of said first switch means is biased to conduct when a signal of predetermined amplitude is applied thereto. A second switch means associated with said electron control device is energized and rotated a predetermined amount due to current flow in said electron control device. The second switch means is effective to actuate the switch arm of said first switch means to connect the output of a succeeding component to said electron control device each time the second switch is actuated.

Other objects and advantages of our invention will become apparent from the followng description and the accompanying drawing in which:

The sole FIGURE shows a schematic diagram of the checking system embodying our invention.

We shall first describe one embodiment of a checking system according to our invention, and shall then point out the novel features thereof in the appended claims.

Referring now to the drawing, and beginning at the center section thereof, there is shown a stepping switch means 11 having a switch arm 13 initially positioned to bear on a contact numeral 0. A spring biased contact button 15, may be momentarily closed to complete an electrical path from an alternating current signal source 17 through a series resistor 19, contact 0 and switch arm 13 of stepping switch means 11 to one terminal of the primary winding 21 of a transformer 23. One terminal of the secondary winding 25 of transformer 23 couples the signal to the anode 27 of diode rectifier 29. The other terminals of primary winding 21 and secondary winding 25 are connected to the checking system ground reference. The signal output from rectifier 29 is taken from its cathode 31, across a resistance 33 connected in series between cathode 31 and checking system ground reference, and coupled to the control electrode 35 of electron discharge device 37. Electron discharge device 37 may be in the form of a vacuum tube including an anode 39, a cathode 40, and the control electrode 35. Anode 39 is connected through a relay 45 and a resistance 44 connected in series therewith to a direct current source 48. A capacitor 90 is connected in parallel with relay 45 and resistance 44. Cathode 40 is connected in series with a potentiometer 41, including an adjustable arm 42, thereon, and spring biased breaker contacts 43 to the checking system ground reference. Breaker contacts 43 which are normally closed are arranged to be opened or separated momentarily as will be described hereinbelow, and may be an element of a stepping switch device 50 known as a Ledex Style Rotary Solenoid of a type manufactured by G. H. Leland Company, Dayton, Ohio.

Energization of relay 45, due to conduction in electron discharge device 37, causes its front contact *a* to close to complete an electrical path from a direct current source 53 through a rotor actuating coil 47 of rotary solenoid 50 to the checking system ground reference. Energization of coil 47 causes a rotor 51 to rotate a predetermined number of degrees, and in this particular embodiment, 90°.

It will be understood that other types of stepping switch devices could also be satisfactorily employed, and that the invention is not in any way limited to the particular rotary solenoid type employed in the embodiment shown.

A condenser 57 is connected in shunt with the contact *a* of relay 45 for purposes of arc suppression. A manually operated contact button 55 is also connected in shunt across contact *a* of relay 45 in order to provide means for by-passing said contact and energizing coil 47 when desired.

Signal source 17 also connects to one terminal of the primary winding 65 of a step-down transformer 67. A switch 58, shown at the instant it closes, completes an electrical circuit from a direct current source 60 through a plurality of relays 61, 62, 63 and 64, connected in parallel, to the checking system ground reference. Energization of the relays 61, 62, 63 and 64 causes each of their respective front contacts *a* and *b* to close connecting one terminal of secondary winding 69 of transformer 67 to amplifiers 10, 20 and 30 which amplifiers are to be checked. Secondly winding 69, the input impedance to the checking sytem, is desirably a very low impedance.

Thus, the operating system which has a relatively high input impedance does not interfere with the amplifier checking system even though said operating system is not disconnected from the checking system circuitry. Energizing the relays 61—63 to close their respective contacts *b* in effect shorts out the operating system input signal and any feedback signals from the amplifiers 10, 20 and 30. As shown, a coaxial line is employed to couple the input signal to each of the amplifiers. The other terminals of primary winding 65 and secondary winding 69 are connected to the checking system ground reference.

It should be understood that the number of amplifiers being checked may vary, and the system of the present invention is not limited to the checking of any particular number of amplifiers or other components. The output amplitude of the component being tested, and in this embodiment, the gain of each of the amplifiers is initially calibrated by an associated series resistance such that the output therefrom causes electron discharge device 37 to conduct, relay 45 to be energized, and rotary solenoid 50 to be actuated. For example, the output signal from amplifier 10 is taken across a load resistance 71 and coupled in series through an adjustable calibrating resistance 81 to contact 1 of switch means 11. The outputs of amplifiers 20 and 30, respectively, are taken across load resistances 72 and 73, and coupled in series through adjustable calibrating resistances 82 and 83 to contacts 2 and 3 of switch means 11.

To initiate the checking operation, switch arm 13 of stepping switch means 11 is manually positioned on contact 0. Contact button 15 is closed momentarily and a signal from source 17 is processed in transformer 23, and rectifier 29, and coupled to control electrode 35. Adjustable arm 42 of potentiometer 41 is set such that the signal from source 17 coupled to control electrode 35 just causes electron discharge device 37 to conduct, thereby energizing relay 45 to close its front contact *a*. Closing of front contact *a* causes coil 47 of rotary solenoid 50 to be energized by source 53. Energization of coil 47 causes rotor 51 to mechanically advance. When rotor 51 advances approximately 90°, breaker contacts 43 are caused to open momentarily for a sufficient time interval to cut-off conduction through electron discharge device 37, which in turn causes relay 45 to be deenergized and its front contact *a* to open to disconnect the source 53 from the coil 47. Rotor 51 is mechanically ganged to switch arm 13 of switch means 11 and a 90° rotation of rotor 51 causes switch arm 13 to advance to contact position 1. Rotor 51 is also mechanically ganged to switch arm 59 of switch means 56 and rotation of rotor 51 causes switch arm 59 to advance to its contact position 1.

At this point in the checking operation switch arm 13 bears on contact 1 in position to test amplifier 10. If the signal output from amplifier 10, which output has been initially calibrated by resistance 81, impressed on contact position 1 is the same as, or of greater amplitude than, the voltage from signal source 17 impressed on contact position 0, the same overall operation as previously described will occur. The output voltage from amplifier 10 which is coupled to control electrode 35 will cause electron discharge device 37 to conduct thereby energizing relay 45 to close its front contact *a*. Coil 47 will again be energized by source 53 causing rotor 51 to mechanically advance, breaker contacts 43 to open, electron discharge device 37 to cease conducting, and relay 45 to open its front contact *a*. Switch arm 13 of switch means 11 will be actuated to contact position 2, and switch arm 59 of switch means 56 will be actuated to contact position 2. If the signal output from amplifier 20, calibrated by resistance 82, and impressed on contact position 2 is the same as or of greater amplitude than the voltage impressed on contact position 0, the above sequence of operations is repeated and the switch arms are actuated to contact positions 3 of switch means 11 and 56 in preparation for checking amplifier 30.

After the final amplifier in the series is checked the switch arms 13 and 59 may be actuated toward a stop position from whence said arms may be manually reset to the 0 position. The switch arms 13 and 59 may also be arranged to return to the 0 position directly from the final amplifier contact position.

The discharging time constant of capacitor 90, connected in parallel to relay 45 and resistor 44, determines the point at which relay 45 is deenergized to open its front contact *a*, and thus determines the speed at which the checking system operates.

Should the output of any amplifier, say, for instance, amplifier 20, be below a predetermined level, electron discharge device 37 will not conduct, and correspondingly rotor 51 of rotary solenoid 50 will not be mechanically advanced. Switch arm 13 will remain on contact position 2 of switch means 11. Switch arm 59 will remain on contact position 2 of switch means 56, completing an electrical circuit from source 75 to light lamp No. 20 of lamp bank 79. Each lamp corresponds to a similarly numbered amplifier, and whenever an amplifier fails to provide a signal of sufficiently high amplitude to advance the switch arms 13 and 59 to the next position, a lamp corresponding to the particular amplifier will remain lighted. The operator may thus quickly determine the defective amplifier.

If the amplifier being checked is a motor amplifier, an extra relay 64 may be added which when energized closes its front contact *a* to remove the fixed phase voltage and short circuit the fixed phase motor supply terminals of a motor M, to thus eliminate any undesirable electromagnetomotive force that might be persent if the motor were permitted to rotate.

Relays 61, 62, 63 and 64 function to switch the signal voltage to the amplifier. For some operations these relays may be omitted. However, in the embodiment of the circuit shown it was desired to shorten the length of the input coaxial line leads connected to the various amplifiers, and relays are desirable. In the embodiment shown each of the input coaxial line leads is only a few inches in length in order to cut down possible noise pickup due to the high impedance of the leads.

As noted in the figure, the respective contact *a* of each of the relays 61, 62 and 63 is actuated between a front contact connected to a checking system ground when the checking system is in operation, and a back contact connected to an operating system ground when the operating system is functioning normally. This is desirable to assure that the operating system is not disrupted due to any possible difference in the relative potential of the ground reference of the amplifier checking system and the ground reference of the operating system.

While our invention has been described with reference to a particular embodiment thereof, it will be understood that various modifications may be made by those skilled in the art without departing from the invention. The appended claims are therefore intended to cover all such modifications within the true spirit and scope of the invention.

Having thus described our invention, what we claim is:

1. A system for sequentially checking the output voltage amplitude of each of a series of amplifiers comprising, means to connect amplifiers to a reference source of signal energy, first switch means including a switching arm and a plurality of contacts, a first of said contacts being connected to said source of signal energy, means connecting the output of each of said amplifiers to respective ones of the other of said contacts, an electron control device connected to said contacts and rendered conductive when the potential applied thereto is of predetermined amplitude, the switching arm of said first switch means connecting signal energy to said electron control device, relay means connected in the electrical circuit of said electron control device, breaker contacts connected in the electrical circuit of said electron control device, rotary switch means rotated when said relay means is energized due to conduction in said electron control device, rotation of said rotary switch a predetermined amount causing said breaker contacts to open to interrupt the electrical continuity of said electron control device, said first and rotary switch means being mechanically interconnected such that rotation of said rotary switch causes the switch arm of said first switch means to move toward a succeeding contact, third switch means being mechanically interconnected with said first and rotary switch means, said third switch means including a plurality of contacts and a switching arm, and a lamp bank consisting of a plurality of lamps connected by the switch arm of said third switch means to a suitable source of energy.

2. A system for sequentially checking the output voltage amplitude of each of a series of amplifiers comprising, means to connect said amplifiers to a reference source of signal energy, first switch means including a switching arm and a plurality of contacts, a first of said contacts being connected to said source of signal energy, means connecting the output of each of said amplifiers to respective ones of the other of said contacts, means calibrating the output of each of said amplifiers, transformer means, rectifier means, an electron discharge device including an anode, a control electrode and a cathode, said first switch means having its switching arm electrically connected through said transformer and said rectifying means to said control electrode of said electron discharge device, said electron discharge device being rendered conductive when the potential applied thereto is of a predetermined amplitude, rotary switch means including a rotatable member and including breaker contacts connected in the cathode circuit of said electron discharge device, relay means connected in the anode circuit of the said electron discharge device and energized by conduction in said electron discharge device, said relay means being effective when energized to connect said rotary switch means to a source of energy to cause said rotatable member to be actuated, actuation of said rotatable member a predetermined amount causing said breaker contacts to open to interrupt the electrical continuity of said electron discharge device, said first switch means and said rotary switch being mechanically interconnected such that actuation of said rotatable member causes the switching arm of said first switch means to move toward another contact.

3. In an operating system having a high input impedance and including a series of amplifiers, a system for sequentially checking the output voltage amplitude of each of said amplifiers without disconnecting said operating system from said amplifiers, relatively low impedance means for said checking system to connect said amplifiers to a reference source of signal energy, stepping switch means having a plurality of contacts and a switching arm, means including a calibrating impedance connecting the output from each of said components to a designated one of the contacts of said first switch means, a motivating means receiving the output voltage from the said components and actuated when the voltage coupled thereto is of predetermined amplitude, and a second switch means actuated in response to energization of said motivating means, said second switch means being mechanically connected to said switching arm, and actuation of said second switch means causing the switching arm of said stepping switch means to be actuated to another of its associated contacts.

References Cited in the file of this patent

UNITED STATES PATENTS

| | | |
|---|---|---|
| 1,450,563 | Powell | Apr. 3, 1923 |
| 1,973,520 | Belt | Sept. 11, 1934 |
| 2,437,876 | Cohn | Mar. 16, 1948 |
| 2,629,000 | Olson et al. | Feb. 17, 1953 |
| 2,677,804 | Foster et al. | May 4, 1954 |
| 2,686,849 | Thomas | Aug. 17, 1954 |

FOREIGN PATENTS

| | | |
|---|---|---|
| 612,362 | Great Britain | Nov. 11, 1948 |